United States Patent
Ringer et al.

(10) Patent No.: US 11,875,712 B2
(45) Date of Patent: Jan. 16, 2024

(54) SAFETY SIGN DEVICE WITH HINGE AND RELATED METHODS

(71) Applicants: Danny Ringer, Daytona Beach, FL (US); Anthony J. Bilello, Ormond Beach, FL (US); Shawn Beauchamp, North Palm Coast, FL (US); Christopher J. Bilello, Ormond Beach, FL (US)

(72) Inventors: Danny Ringer, Daytona Beach, FL (US); Anthony J. Bilello, Ormond Beach, FL (US); Shawn Beauchamp, North Palm Coast, FL (US); Christopher J. Bilello, Ormond Beach, FL (US)

(*) Notice: Subject to any disclaimer, the term of this patent is extended or adjusted under 35 U.S.C. 154(b) by 0 days.

(21) Appl. No.: 18/049,512

(22) Filed: Oct. 25, 2022

(65) Prior Publication Data

US 2023/0076235 A1   Mar. 9, 2023

Related U.S. Application Data

(63) Continuation of application No. 17/239,772, filed on Apr. 26, 2021, now Pat. No. 11,479,166, which is a
(Continued)

(51) Int. Cl.
*G09F 7/22* (2006.01)
*G09F 9/33* (2006.01)
(Continued)

(52) U.S. Cl.
CPC .............. *G09F 7/22* (2013.01); *G09F 9/33* (2013.01); *G09F 21/048* (2013.01); *H04N 7/188* (2013.01);
(Continued)

(58) Field of Classification Search
CPC . G09F 7/22; G09F 9/33; G09F 21/018; G09F 2007/005; G09F 2007/1865;
(Continued)

(56) References Cited

U.S. PATENT DOCUMENTS

| 4,559,518 A | * | 12/1985 | Latta, Jr. | ................. | B60Q 1/50 |
| | | | | | 116/28 R |
| 4,565,152 A | * | 1/1986 | Bennett | .................... | B60Q 1/50 |
| | | | | | 116/303 |

(Continued)

OTHER PUBLICATIONS

Stop Arm Fixed Extension (S.A.F.E.) Gates; ttp://web.archive.org/web/20160307063520/http://safegates.net/ Retreived from internet on Jun. 7, 2017; pp. 2.
(Continued)

*Primary Examiner* — Gary C Hoge
(74) *Attorney, Agent, or Firm* — Allen, Dyer, Doppelt + Gilchrist, PA

(57) ABSTRACT

A safety sign device is for a vehicle. The safety sign device may include a hinge being coupled a side of the vehicle, and an arm. The arm may include an elongate base, an electric motor coupled to the elongate base, an elongate housing coupled to the elongate base, and visual indicators carried by the elongate housing. The safety sign device may also include a sign coupled to the arm and being parallel to the arm. The hinge may include a pin, and a link assembly coupled between the pin and the electric motor and being rotatable about the pin. The electric motor may be configured to extend and retract the arm between a retracted position and an extended position.

18 Claims, 20 Drawing Sheets

Related U.S. Application Data continuation-in-part of application No. 17/021,142, filed on Sep. 15, 2020, now Pat. No. 11,180,078, which is a continuation-in-part of application No. 16/505,848, filed on Jul. 9, 2019, now Pat. No. 10,780,823, which is a continuation of application No. 16/040,646, filed on Jul. 20, 2018, now Pat. No. 10,343,598, which is a continuation-in-part of application No. 15/595,015, filed on May 15, 2017, now Pat. No. 10,062,309.

(60) Provisional application No. 63/014,821, filed on Apr. 24, 2020.

(51) Int. Cl.
| | |
|---|---|
| *G09F 21/04* | (2006.01) |
| *H04N 7/18* | (2006.01) |
| *G09F 7/18* | (2006.01) |
| *G09F 7/00* | (2006.01) |

(52) U.S. Cl.
CPC ............ *G09F 2007/005* (2013.01); *G09F 2007/1865* (2013.01); *G09F 2007/1873* (2013.01)

(58) Field of Classification Search
CPC . G09F 2007/1873; B60Q 1/50; B60Q 1/2615; B60Q 21/34; B60Q 2021/0067
See application file for complete search history.

(56) References Cited

U.S. PATENT DOCUMENTS

| | | | | |
|---|---|---|---|---|
| 4,697,541 | A * | 10/1987 | Wicker | B60Q 1/50 116/28 R |
| 4,766,413 | A * | 8/1988 | Reavell | B60Q 1/50 180/289 |
| 4,816,804 | A * | 3/1989 | Reavell | B60Q 1/50 180/289 |
| 4,825,192 | A * | 4/1989 | Wells | B60R 19/38 280/765.1 |
| 5,036,307 | A * | 7/1991 | Reavell | B60Q 1/50 340/487 |
| 5,038,136 | A * | 8/1991 | Watson | B60Q 1/50 340/487 |
| 5,281,948 | A * | 1/1994 | Estrada | B60Q 1/50 340/488 |
| 5,355,117 | A * | 10/1994 | Jefferson | B60Q 1/48 16/280 |
| 5,382,953 | A * | 1/1995 | Hauptli | G08G 1/0175 348/148 |
| 5,406,250 | A * | 4/1995 | Reavell | B60Q 1/50 318/434 |
| 5,406,251 | A * | 4/1995 | Leis | B60Q 1/50 116/39 |
| 5,564,359 | A * | 10/1996 | Harder | B60R 21/34 116/28 R |
| 5,620,219 | A | 4/1997 | Servant | |
| 5,634,287 | A * | 6/1997 | Lamparter | G09F 13/04 362/540 |
| 5,635,902 | A * | 6/1997 | Hochstein | B60Q 1/2692 340/471 |
| 5,812,052 | A * | 9/1998 | Swanger | B60Q 1/50 318/281 |
| 6,213,047 | B1 * | 4/2001 | Means | B60Q 1/2657 116/28 R |
| 6,234,105 | B1 * | 5/2001 | Lamparter | B60R 21/34 116/28 R |
| 6,765,481 | B2 | 7/2004 | Haigh et al. | |
| 7,474,201 | B2 * | 1/2009 | Swanger | B60Q 1/50 40/430 |
| 7,938,594 | B1 | 5/2011 | Schindler | |
| 8,820,628 | B2 | 9/2014 | McKinnon | |
| 9,032,652 | B2 | 5/2015 | Barker | |
| 9,245,465 | B1 * | 1/2016 | Geyer | B60Q 1/324 |
| 2003/0070603 | A1 * | 4/2003 | VanderMolen | B60Q 1/50 116/28 R |
| 2004/0232859 | A1 * | 11/2004 | Phillips | B60Q 1/50 318/1 |
| 2005/0200461 | A1 * | 9/2005 | Redfield | B60Q 1/50 318/287 |
| 2007/0252538 | A1 * | 11/2007 | Swanger | B60Q 1/2692 340/433 |
| 2008/0157945 | A1 * | 7/2008 | Bowler | B60Q 1/0023 348/148 |
| 2008/0169918 | A1 * | 7/2008 | Vidri | B60Q 1/50 340/487 |
| 2008/0282964 | A1 * | 11/2008 | Bennett | G09F 17/00 116/28 R |
| 2009/0109009 | A1 * | 4/2009 | Gumbel | B60Q 9/00 340/433 |
| 2012/0013454 | A1 * | 1/2012 | Krugh, IV | B60Q 1/50 340/433 |
| 2012/0111261 | A1 * | 5/2012 | Schmitt | B60Q 1/2657 116/28 R |
| 2016/0096469 | A1 * | 4/2016 | O'Brien | B60Q 1/2692 116/63 R |
| 2016/0347247 | A1 * | 12/2016 | Espey | B60Q 1/52 |
| 2022/0009410 | A1 * | 1/2022 | Torres | B60Q 1/50 |

OTHER PUBLICATIONS

Safely Cross Arby Creach the President of the Florida Association of Pupil Transportation & the Transportation Director of Osceola County Feb. 12, 2019; https://www.facebook.com/191610368109427/videos/381527375760904/ pp. 1.

Safely Cross "Improved Extended Stop Arm" https://www.facebook.com/19161 03681 09427 /videos/366026200879407/ Jan. 29, 2019; pp. 1.

* cited by examiner

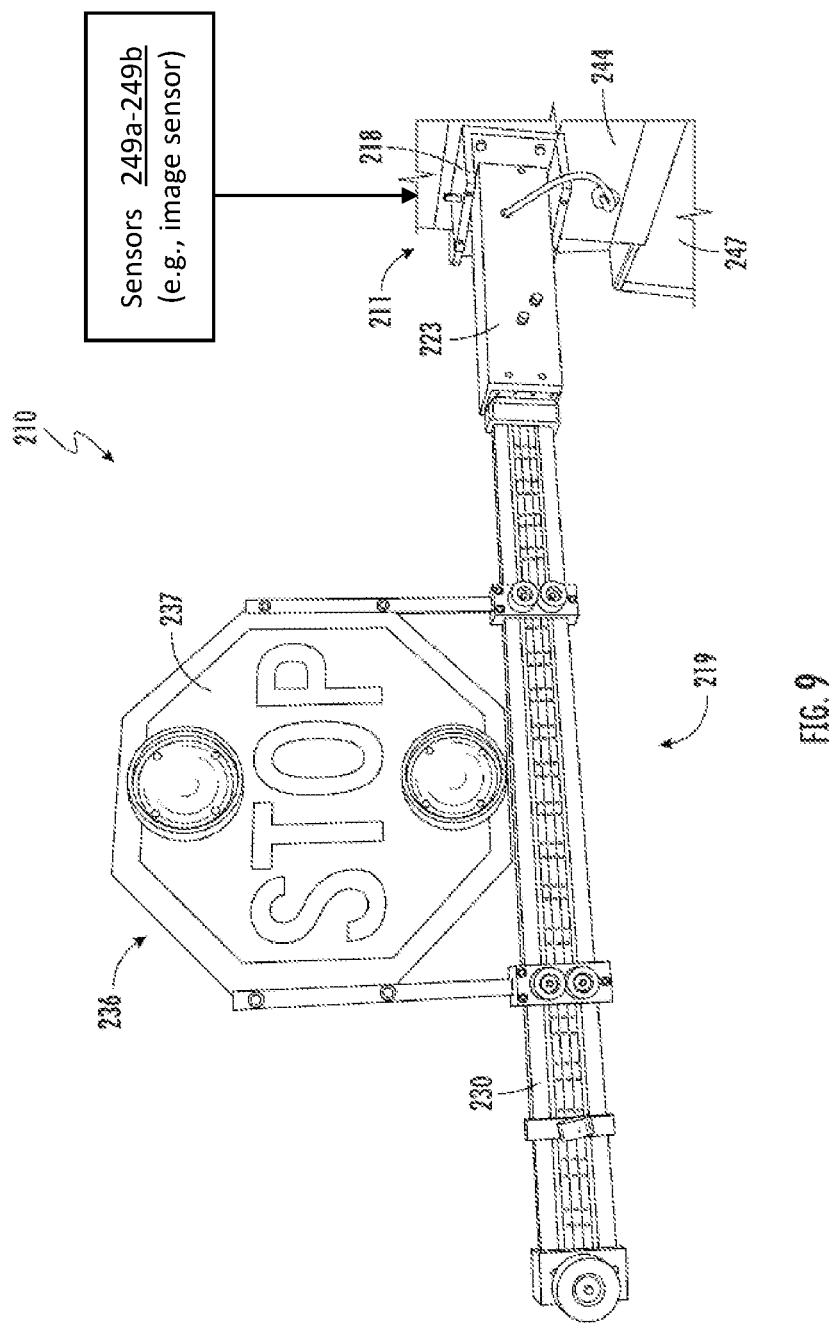

SAFETY SIGN DEVICE WITH HINGE AND RELATED METHODS

RELATED APPLICATIONS

This application is a continuation application of application Ser. No. 17/239,772 filed Apr. 26, 2021, which claims priority to provisional patent application Ser. No. 63/014,821 filed Apr. 24, 2020 and is a continuation-in-part of application Ser. No. 17/021,142 filed Sep. 15, 2020, which is a continuation of application Ser. No. 16/505,848 filed Jul. 9, 2019, now U.S. Pat. No. 10,780,823, which is a continuation of application Ser. No. 16/040,646 filed Jul. 20, 2018, now U.S. Pat. No. 10,343,598, which is a continuation-in-part of application Ser. No. 15/595,015 filed May 15, 2017, now U.S. Pat. No. 10,062,309, which are hereby incorporated herein in their entireties by reference.

TECHNICAL FIELD

The present disclosure relates to the field of safety devices, and, more particularly, to a school bus safety device and related methods.

BACKGROUND

Given the primary purpose of a school bus vehicle, these vehicles include several safety devices. Indeed, governmental regulation, both federal and state level, require certain features. In particular, the Federal Motor Vehicle Safety Standards (FMVSS) for School Buses requires school bus pedestrian safety devices, for example, a stop signal arm, roll over protection, body joint strength, and passenger seating and crash protection. Of course, the federal and state regulations merely establish a floor requirement for safety devices, and there is a robust market for supplemental safety devices, such as the near ubiquitous school bus crossing arm.

Federal regulations define the "[s]top signal arm means [as] a device that can be extended outward from the side of a school bus to provide a signal to other motorists not to pass the bus because it has stopped to load or discharge passengers." 49 C.F.R. § 571.131. Regulations mandate the shape and font lettering size for the stop signal arm. Nevertheless, there have been several approaches to improving the visibility of the stop signal arm.

For example, U.S. Pat. No. 9,245,465 to Geyer et al. discloses another approach to the stop signal arm device. This device extends further into the adjacent lane to reduce instances in which motorists pass a stopped school bus. A first frame is permanently secured to conventional stop sign mechanism. A second breakaway frame or arm is attachable to and detachable from the first frame, and extends beyond the conventional stop sign. If a vehicle strikes the second frame, it separates without significantly damaging the conventional stop sign mechanism. The extension arm can be moved between a retracted and extended position by the same mechanism that opens and closes the conventional stop sign, or with a new mechanism entirely.

SUMMARY

Generally, a safety sign device is for a vehicle. The safety sign device may include a hinge being coupled a side of the vehicle, and an arm. The arm may include an elongate base, an electric motor coupled to the elongate base, an elongate housing coupled to the elongate base, and a plurality of visual indicators carried by the elongate housing. The safety sign device may also comprise a sign coupled to the arm and being substantially parallel to the arm. The hinge may include a pin, and a link assembly coupled between the pin and the electric motor and being rotatable about the pin. The electric motor may be configured to extend and retract the arm between a retracted position and an extended position.

More specifically, the link assembly may comprise first and second link arms coupled between the pin and the electric motor, and the first and second link arms may be rotatable about the pin. The arm may comprise a connection assembly coupled between the elongate base and the elongate housing. The connection assembly may comprise first and second elastic devices coupled to adjacent portions of the elongate base, and the connection assembly may be configured to permit the elongate housing to be flexible with respect to the elongate base. The connection assembly may further comprise first and second flexible strips coupled to the elongate housing, and a housing receiving the first and second flexible strips opposite the elongate housing. Also, the housing may receive the first and second elastic devices respectively on opposing surfaces of the housing, and the housing may be movable between the first and second elastic devices.

Moreover, the plurality of visual indicators may be configured to be activated when the arm is in the extended position. The elongate housing may comprise opposing first and second longitudinal sides, and the plurality of visual indicators may be carried on both of the opposing first and second longitudinal sides. In some embodiments, the safety sign may further comprise an image sensor, and a sensor coupled to the image sensor and configured to detect when the arm is flexed beyond a threshold limit while in the extended position. The sensor may be triggered, the image sensor device is configured to record an area adjacent the arm.

Another aspect is directed to a method for making a safety sign device for a vehicle. The method may include coupling a hinge to a side of the vehicle, and coupling an arm to the hinge. The arm may include an elongate base, an electric motor coupled to the elongate base, an elongate housing coupled to the elongate base, and a plurality of visual indicators carried by the elongate housing. The method may further include coupling a sign to the arm and being substantially parallel to the arm. The hinge may comprise a pin, and a link assembly coupled between the pin and the electric motor and being rotatable about the pin. The electric motor may be configured to extend and retract the arm between a retracted position and an extended position.

BRIEF DESCRIPTION OF THE DRAWINGS

FIG. 9 is a schematic perspective view of another embodiment of the safety sign device in an extended position and associated vehicle, according to the present disclosure.

DETAILED DESCRIPTION

Figure 1:
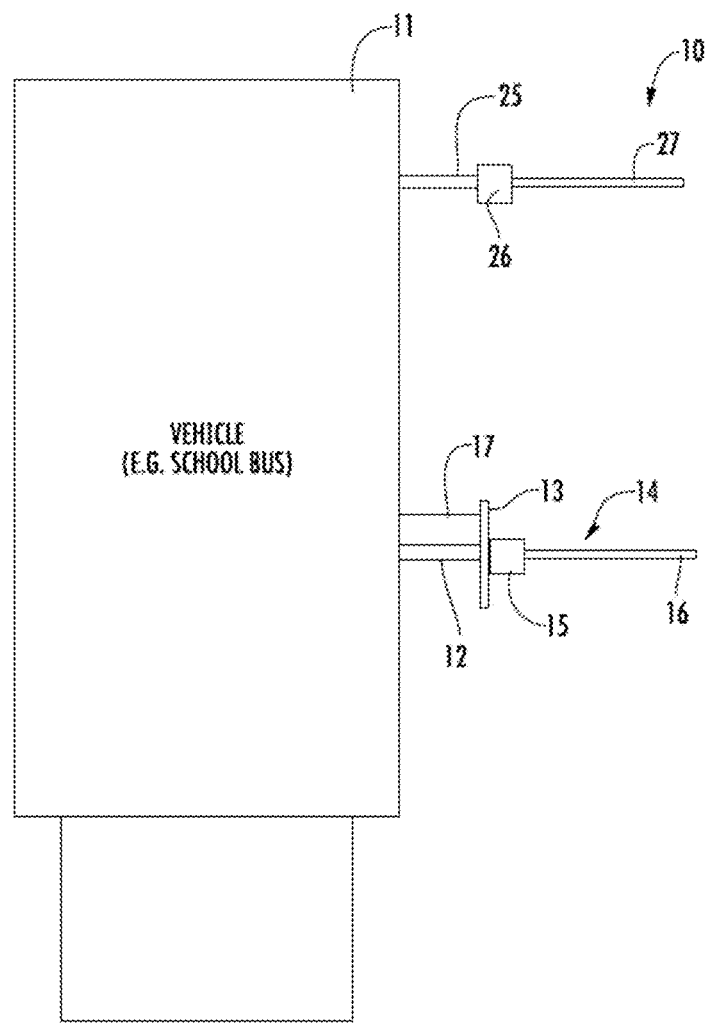
FIG. 1 is a schematic diagram of a safety sign device and associated vehicle, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIGS. 1-4, a safety sign device 10 according to the present disclosure is now described. The safety sign device 10 is illustratively attached to a vehicle 11. The vehicle 11 may comprise, for example, a school bus (providing a stop signal device), or a truck. The safety sign device 10 illustratively includes a first sign (e.g. a stop sign) 12 having proximal (i.e. closer to the vehicle) and distal (i.e. further from the vehicle) ends, and a first hinge 19 being coupled to the proximal end of the first sign. The first hinge 19 is also coupled to a side of the vehicle 11.

Figure 2:
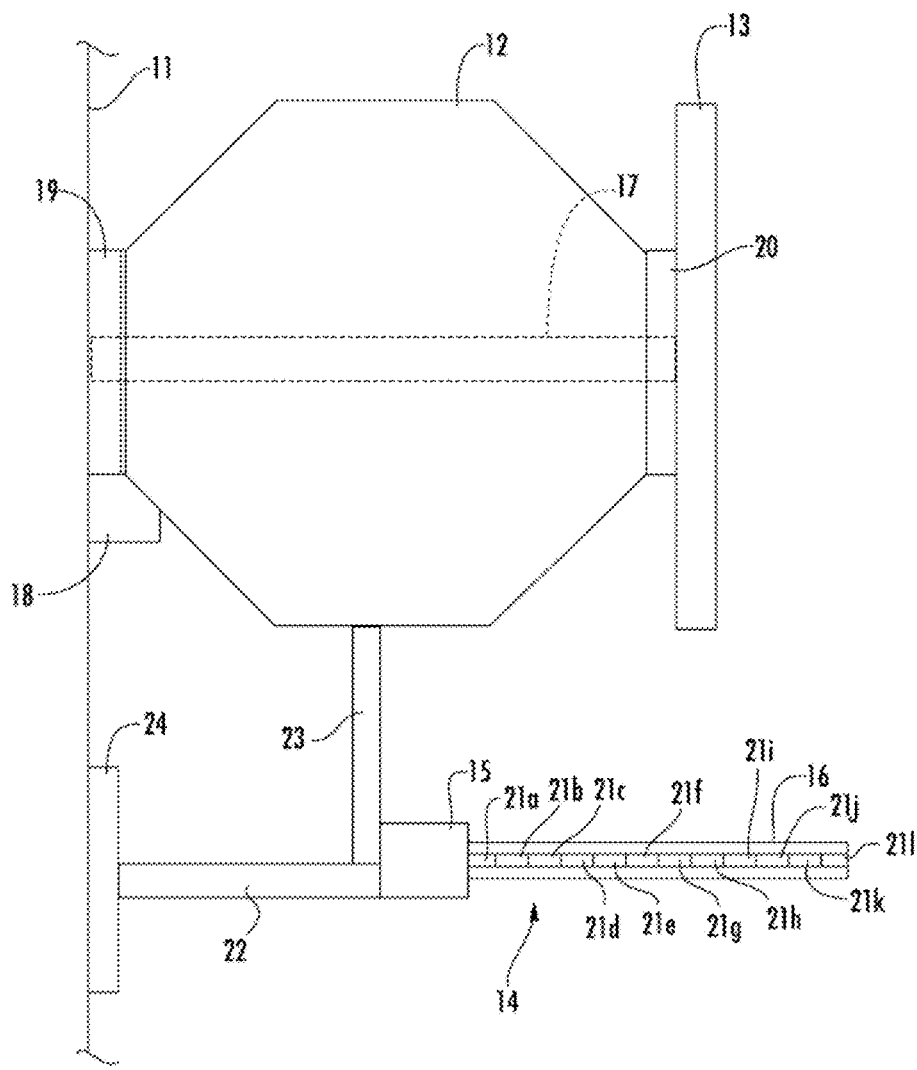
FIG. 2 is a front view of the safety sign device in an extended position.
Figure 3:
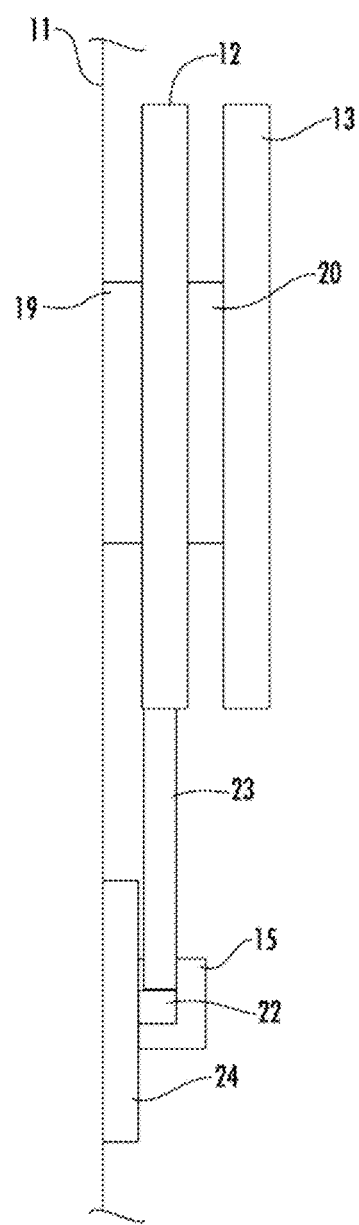
FIG. 3 is a front view of the safety sign device in a retracted position.
Figure 4:
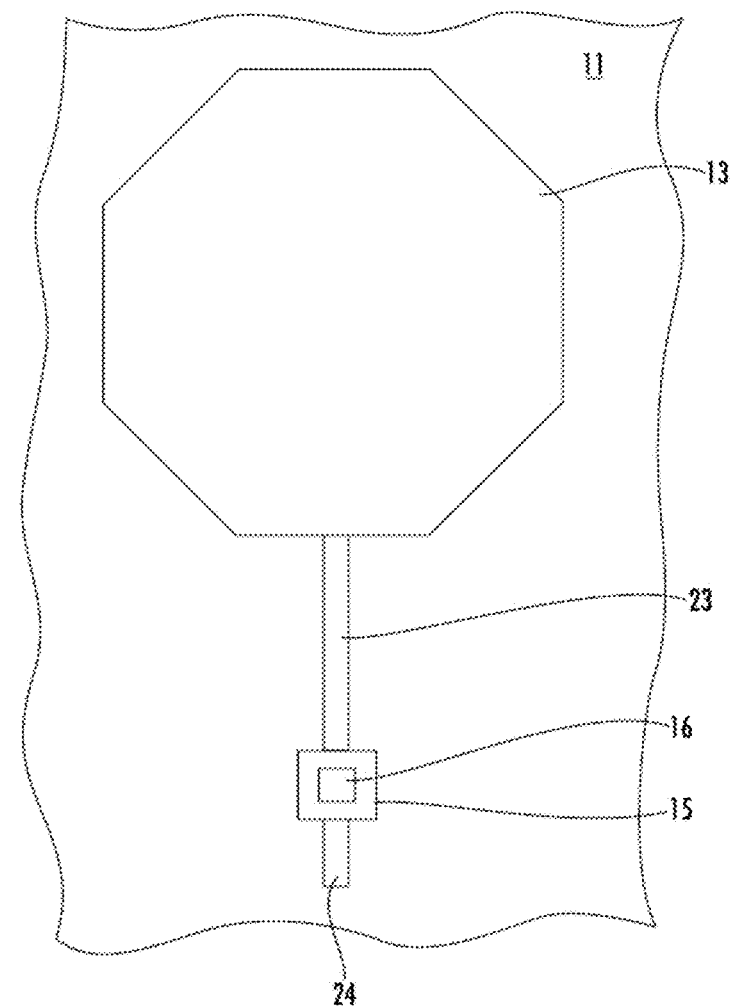
FIG. 4 is a side elevational view of the safety sign device in the extended position.

The safety sign device 10 illustratively includes a second hinge 20 being coupled to the distal end of the first sign 12, and a second sign (e.g. a stop sign) 13 having a medial portion coupled to the second hinge, thereby providing a dual hinged/dual signed safety sign device. The first and second hinges 19, 20 are coupled at opposite sides of the first sign 12. The safety sign device 10 illustratively includes an arm 17 coupled between the second sign 13 and the side of the vehicle 11 and configured to extend and retract the first and second signs 12-13 between a retracted position (FIG. 3) and an extended position (FIG. 2).

As will be appreciated, in the school bus application, the first and second signs 12-13 would be in the extended position when stopped and transferring passengers. The first and second signs 12-13 are transverse to each other in the extended position. In particular, the first and second signs 12-13 are substantially perpendicular to each other in the extended position, i.e. between 75-105 degrees.

Also, the first and second signs 12-13 are flat against the side of the vehicle 11 in the retracted position. As will be appreciated, in the school bus application, the first and second signs 12-13 would be in the retracted position when the vehicle 11 is in motion. In other words, the first and second signs 12-13 are substantially parallel to each other in the retracted position, i.e. within 20 degrees of parallel to each other.

The safety sign device 10 further illustratively includes a first flexible arm 14 coupled to the first sign 12 and comprising an elongate housing 16, and a plurality of visual indicators 21a-21l carried by the elongate housing. In some embodiments, the plurality of visual indicators 21a-21l comprises text based indicators, such as "stop", "slow", "caution", which may be selectively activated via embedded light sources.

The first flexible arm 14 is substantially parallel to the first sign 12. In particular, in a rest/non-flexed state, the first flexible arm 14 is within 20 degrees of parallel to the first sign 12. Helpfully, the first flexible arm 14 enhances visibility, and readily flexes to impact from errant vehicles.

In particular, the first flexible arm 14 illustratively includes an elastic base 15 coupled between the elongate housing 16 and the first sign 12. For example, the elastic base 15 may comprise a plurality of springs, a double barreled hinge, or a 180 degree swivel hinge. In some embodiments, the elastic base 15 includes a plurality of aligned heavy duty springs. In other embodiments, the elastic base 15 may comprise a flexible polymer base having an H-shape. For example, the elastic base 15 may be constituted similarly to the lower portion of the traffic beacon disclosed in U.S. Pat. No. 7,938,594 to Schindler, the entire contents of which are hereby incorporated by reference.

In fact, due to the elastic base 15, if the first flexible arm 14 is impacted during an accident, the elongate housing 16 will readily bend away and return to its original position. Helpfully, the first flexible arm 14 is resistant to damage and inflicts little damage on the other vehicle. This is contrast to the breakaway approach of U.S. Pat. No. 9,245,465 to Geyer et al., which is costly to repair. Moreover, the light weight approach of the safety sign device 10 is readily retrofitted onto existing stop signal devices.

Also, the first flexible arm 14 has lower position close to the ground, than the approach of the '465 patent, which makes it more difficult for errant vehicles to drive under the warning arm. The first flexible arm 14 also extends longitudinally further out than the approach of the '465 patent, which enhances visibility.

In another embodiment, the elongate housing 16 of the first flexible arm 14 may comprise a rubberized external layer (other materials could be used, e.g., foam plastic). Helpfully, this rubberized external layer prevents damage to errant vehicles. Also, the external layer prevents inadvertent damage to a paint layer of the side of the vehicle 11.

The plurality of visual indicators 21a-21l is configured to be activated when the first and second signs 12-13 are in the extended position. In some embodiments, the elongate housing 16 comprises opposing first and second longitudinal sides, and the plurality of visual indicators 21a-21l is to be carried on both of the opposing first and second longitudinal sides. Additionally, the plurality of visual indicators 21a-21l may comprise a plurality of LEDs.

In some embodiments, the elongate housing 16 may comprise an anti-ballistic plastic material. In other embodiments, the elongate housing 16 may comprise a metallic material or cellulose material (e.g. wood material).

In the illustrated embodiment, the safety sign device 10 further illustratively includes a fourth hinge 24, and first and second supports 22-23 coupled between the fourth hinge and the first sign 12. The first flexible arm 14 is coupled to a medial joint of the first and second supports 22-23. In other embodiments, the first flexible arm 14 may be coupled directly to the first sign 12, thereby eliminating the first and second supports 22-23.

The safety sign device 10 illustratively includes a motor 18 coupled to the arm 17 and configured to toggle the first and second signs 12-13 between the extended and retracted positions. In some embodiments, the motor 18 may be alternatively coupled to the first hinge 19 for extending the first sign 12. Advantageously, via the action of the arm 17 and the second hinge 20, the second sign 13 rotates outward into the transverse position.

Figure 5:
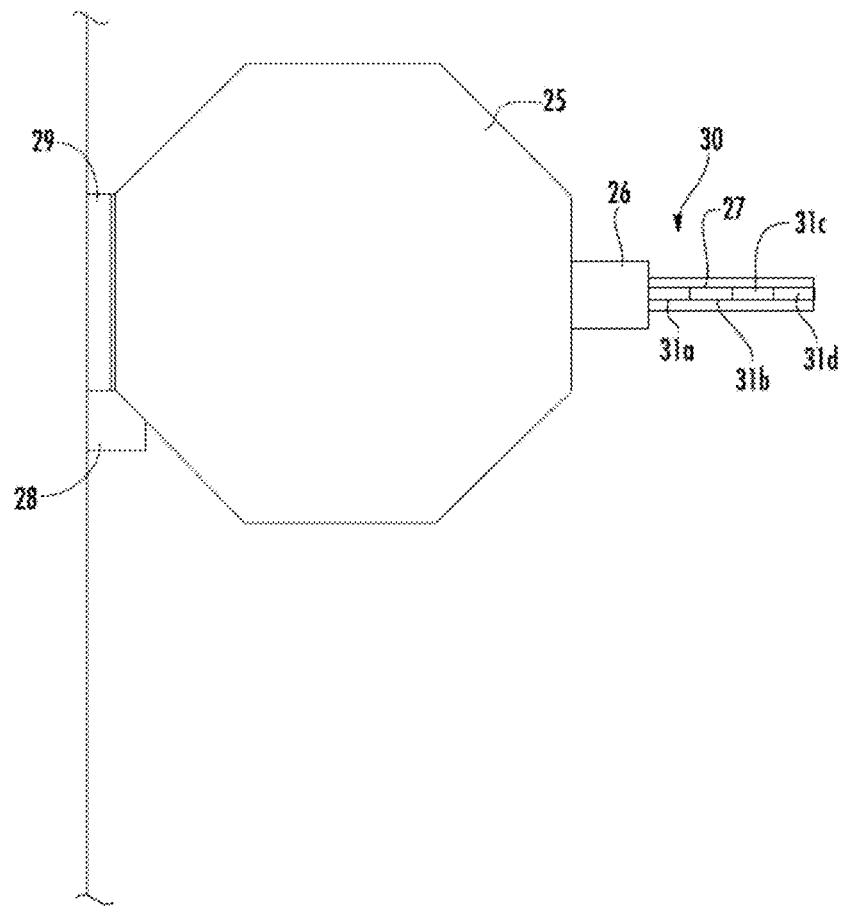
FIG. 5 is a front view of a third sign in an example embodiment of the safety sign device in an extended position.

Referring now additionally to FIG. 5, the safety sign device 10 illustratively includes a third sign 25 having proximal and distal ends, and a third hinge 29 being coupled to the proximal end of the third sign. The third hinge 29 is coupled to the side of the vehicle 11 spaced apart from the first hinge 19 and adjacent a rear of the vehicle. The safety sign device 10 illustratively includes a second flexible arm 30 coupled to the distal end of the third sign 25. The second flexible arm 30 illustratively includes an elastic base 26 coupled to the distal end of the third sign 25, an elongate housing 27 coupled to the elastic base, and a plurality of visual indicators 31a-31d carried by the elongate housing.

The safety sign device 10 illustratively includes an additional motor 28, and a third hinge 29 powered by the motor to switch between retracted and extended (FIG. 5) positions. In the extended position, the second flexible arm 30 is substantially parallel to the third sign 25. In particular, in a rest/non-flexed state, the second flexible arm 30 is within 20 degrees of parallel to the third sign 25. In the retracted position, the third sign 25 and the second flexible arm 30 are flat against the side of the vehicle 11. In other words, the third sign 25 is substantially parallel to the side of vehicle 11, i.e. within 20 degrees of parallel to each other.

In some embodiments, the motors 18, 28 may be onboard motors provided by the vehicle 11. In other embodiment, the motors 18, 28 be modular and separate from the original vehicle, i.e. aftermarket.

Figure 6:
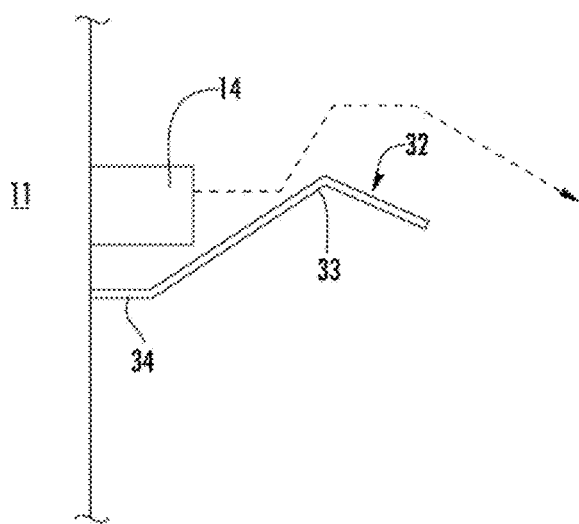
FIG. 6 is a front view of a retention device in an example embodiment of the safety sign device in a retracted position.

In yet another embodiment (FIG. 6), the safety sign device 10 illustratively includes a retention device 32 coupled to the side of the vehicle 11. The retention device 32 is configured to retain the first flexible arm 14 firmly and securely against the side of the vehicle 11 while in the retracted position. Advantageously, this feature also prevents inadvertent damage to the paint layer of the side of the vehicle 11 from movement during motion of the vehicle. The retention device 32 may comprise a flexible retention arm with a medial bump 33 configured to require the first flexible arm 14 to flex upward and out (see dashed line in FIG. 6) when being moved out of the retracted position. The retention device 32 also includes a proximal portion 34 extending outward from the side of the vehicle 11. In other embodiments, the retention device 32 may comprise an interface lock, a magnetic lock, or a spring loaded locking mechanism.

In another embodiment, the safety sign device 10 illustratively includes an image sensor device, and associated memory/processing circuity coupled thereto. In this embodiment, the safety sign device 10 also includes a sensor configured to detect when the first flexible arm 14 is flexed beyond a threshold limit while in the extended position, for example, greater than 20 degrees from rest position (threshold degree could be between 10-45 degrees). When the sensor is triggered, the image sensor device would record the area adjacent and underneath the first flexible arm 14 for record keeping purposes.

Another aspect is directed to a method for making a safety sign device 10 for a vehicle 11. The method includes coupling a first hinge 19 to a proximal end of a first sign 12, the first hinge being coupled to a side of the vehicle 11, coupling a second hinge 20 to a distal end of the first sign, and coupling a medial portion of a second sign 13 to the second hinge. The method also includes coupling an arm 17 between the second sign 13 and the side of the vehicle 11, the arm configured to extend and retract the first and second signs 12-13 between a retracted position and an extended position. The first and second signs 12-13 are transverse to each other in the extended position, and are flat against the side of the vehicle 11 in the retracted position. The method comprises coupling a first flexible arm 14 to the first sign 12 and comprising an elongate housing 16, and a plurality of visual indicators 21a-21l carried by the elongate housing, the first flexible arm being substantially parallel to the first sign.

Figure 7:
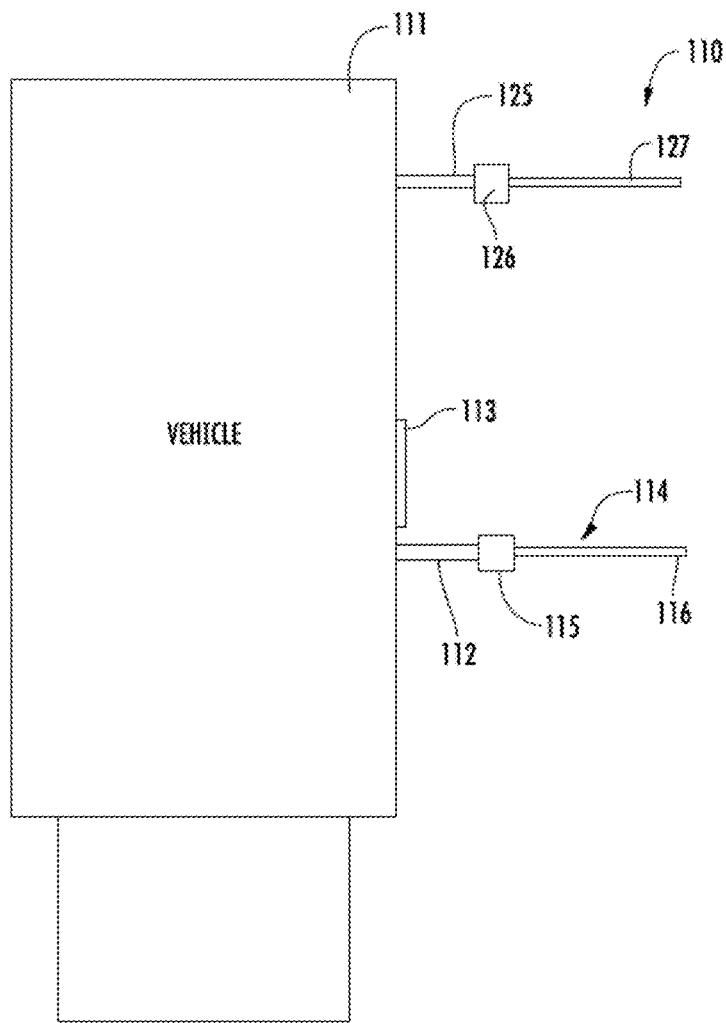
FIG. 7 is a schematic diagram of another embodiment of the safety sign device and associated vehicle, according to the present disclosure.
Figure 8:
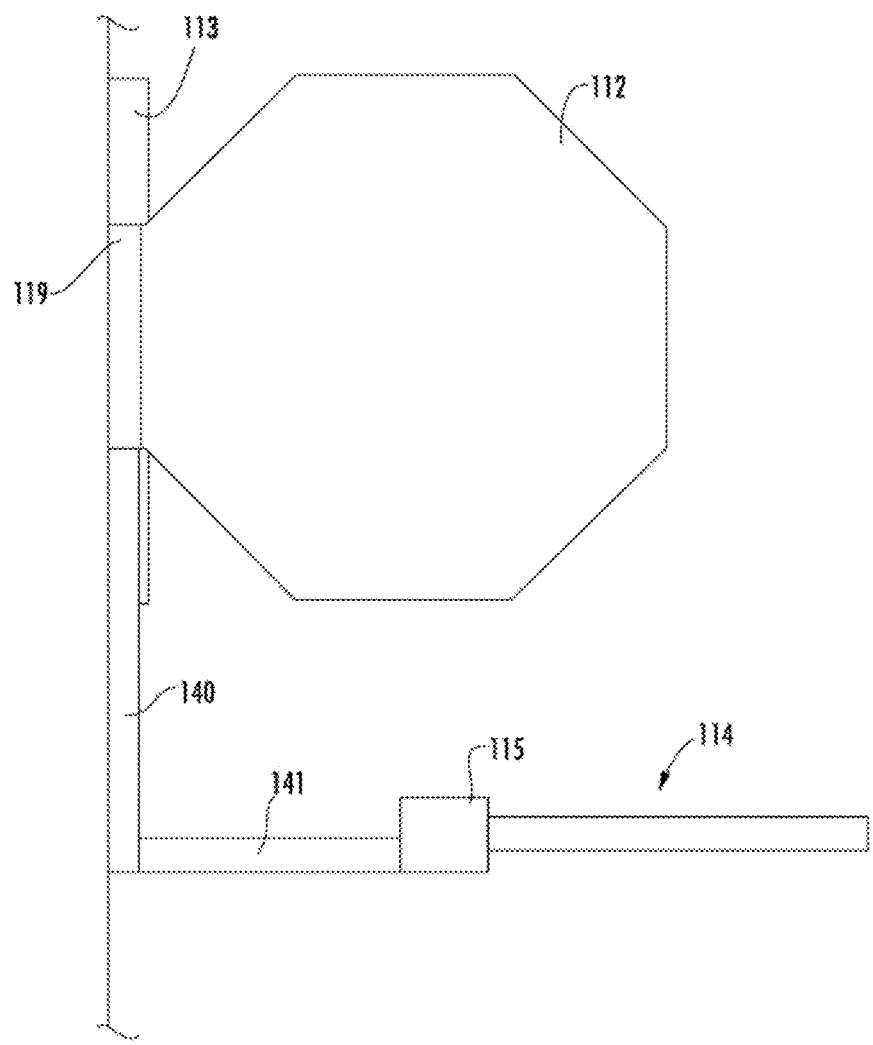
FIG. 8 is a front view of the safety sign device of FIG. 7 in an extended position.

Referring now additionally to FIGS. 7-8, another embodiment of the safety sign device 110 is now described. In this embodiment of the safety sign device 110, those elements already discussed above with respect to FIGS. 1-6 are incremented by 100 and most require no further discussion herein. This embodiment differs from the previous embodiment in that this safety sign device 110 illustratively includes a first sign 112 having proximal and distal end, and a first hinge 119 being coupled to the proximal end of the first sign. The first hinge 119 is illustratively coupled to a side of the vehicle 111.

The safety sign device 110 illustratively includes a second sign 113 being coupled to the side of the vehicle 111 and being substantially parallel (±20° within parallel) to the side of the vehicle. The first hinge 119 is configured to extend and retract the first sign 112 between a retracted position (i.e. flat against the side of the vehicle 111) and an extended position, as perhaps best seen in FIG. 8 (i.e. substantially perpendicular with the side of the vehicle: 75-105 degrees of angle). The first and second signs 112, 113 are transverse to each other in the extended position. In particular, the first and second signs 112, 113 are substantially perpendicular to each other in the extended position, i.e. between 75-105 degrees. The first and second signs 112, 113 may be flat (i.e. substantially parallel to the side of vehicle) against the side of the vehicle 111 in the retracted position.

The safety sign device 110 illustratively includes a first flexible arm 114 coupled to the first hinge 119 and comprising an elongate housing 116, and a plurality of visual indicators carried by the elongate housing. The first flexible arm 114 is substantially parallel to the first sign 112. In particular, in a rest/non-flexed state, the first flexible arm 114 is within 20 degrees of parallel to the first sign 112.

In particular, the second sign 113 is immovably fixed to the side of the vehicle 111, and is permanently mounted, which in contrast to the embodiments of FIGS. 1-6. The safety sign device 110 illustratively includes an L-shaped arm 140-141 coupled between the first hinge 119 and the first flexible arm 114. Since the L-shaped arm 140-141 is coupled to the first hinge 119, when the first sign 112 is placed in the extended position, the L-shaped arm 140-141 is also similarly extended via rotation.

Of course, the L-shaped arm 140-141 is merely exemplary and could be shaped differently, such as canted single arm. The L-shaped arm 140-141 may comprise a material (e.g. steel, aluminum) of sufficient mechanical strength to carry the first flexible arm 114 and absorb potential impact from errant vehicles.

Although not shown in this embodiment, the safety sign device 110 may include a motor coupled to the first hinge 119 and configured to toggle the first sign 112 between the extended and retracted positions. In some embodiments, the vehicle 111 includes a control panel (mounted on the interior for use by the driver) for actuating the motor. The control panel would permit selective actuation of the motor and temporary disablement of the actuation when the vehicle lacks the clearance to extend the first flexible arm 114.

In some embodiments, the motor may be actuated via a wired/wireless remote control, and in other embodiments, the safety sign device 110 may include a controller with a wireless transceiver (e.g. cellular transceiver, IEEE 802.11x transceiver, Bluetooth transceiver). The wireless transceiver would permit remote actuation of the motor over the Internet, such as via a mobile cellular phone software application.

Also, in the illustrated embodiment, the safety sign device 110 is mounted to a longitudinal side of the vehicle 111. In other embodiments, the safety sign device 110 can be mounted to a rear side or a front side of the vehicle 111. In yet other embodiments, the safety sign device 110 can mounted on a tailgate lift or platform attached to the side of the vehicle 111.

Referring now to FIGS. 9-19, a safety sign device 210 according to the present disclosure is now described. The safety sign device 210 is for a vehicle 244. The safety sign device 210 illustratively includes a hinge 211 being coupled a side of the vehicle 244. The hinge 211 includes a knuckle housing 218, a pin 212 received by the knuckle housing, and a toggle fitting 213 coupled to the pin in a fixed rotational position. In other words, the toggle fitting 213 rotates in alignment with the pin 212.

The toggle fitting 213 illustratively comprises an axial passageway 214 extending between major surfaces. The axial passageway 214 receives the pin 212 and defines a slotted recess 215 for interface locking with the pin. The toggle fitting 213 comprises a fitting passageway 216 extending between major surfaces.

The hinge 211 illustratively comprises a link assembly 217 coupled to the pin 212 and being rotatable about the pin. The link assembly 217 comprises first and second link arms 220a-220b coupled to the pin 212, and the first and second link arms are rotatable about the pin. As perhaps best seen in FIG. 17, each of the first and second link arms 220a-220b comprises first and second link passageways 221a-221b, and defines a longitudinal notch 228. The link assembly 217 illustratively comprises a first assembly pin 222a extending through the first link passageway 221a of the first and second link arms 220a-220b, and the fitting passageway 216 of the toggle fitting 213.

The safety sign device 210 includes an arm 219 comprising an elongate base 223, and an electric motor 224 coupled to the elongate base and the link assembly 217. The safety sign device 210 includes a power cable 247 coupled between the electric motor 224 and a power system of the vehicle 244.

In particular, the electric motor 224 illustratively comprises a linear actuator comprising a motor housing 225, and a motor arm 226 extending longitudinally from the motor housing. The motor arm 226 comprises an arm passageway at a distal end thereof. The link assembly 217 illustratively comprises a second assembly pin 222b extending through the second link passageway 221b of the first and second link arms 220a-220b, and the arm passageway of the electric motor 224.

The arm 219 illustratively comprises an elongate housing 230 coupled to the elongate base 223, and a plurality of visual indicators 227a-227n carried by the elongate housing. The arm 219 comprises a connection assembly 231 coupled between the elongate base 223 and the elongate housing 230. The connection assembly 231 comprises first and second elastic devices 232a-232b (e.g. illustrated coil springs) coupled to adjacent portions of the elongate base 223. The connection assembly 231 further comprises a retention plate 233 coupled to the elongate housing 230, first and second flexible strips 234a-234b coupled to the retention plate 233, and a housing 235 receiving the first and second flexible strips opposite the retention plate. Also, the housing 235 receives the first and second elastic devices 232a-232b respectively on opposing surfaces of the housing.

The housing 235 is movable between the first and second elastic devices 232a-232b, providing a pivoting motion. Due to this motion of the housing 235, the connection assembly 231 is configured to permit the elongate housing 230 to be flexible with respect to the elongate base 223.

Figure 11:
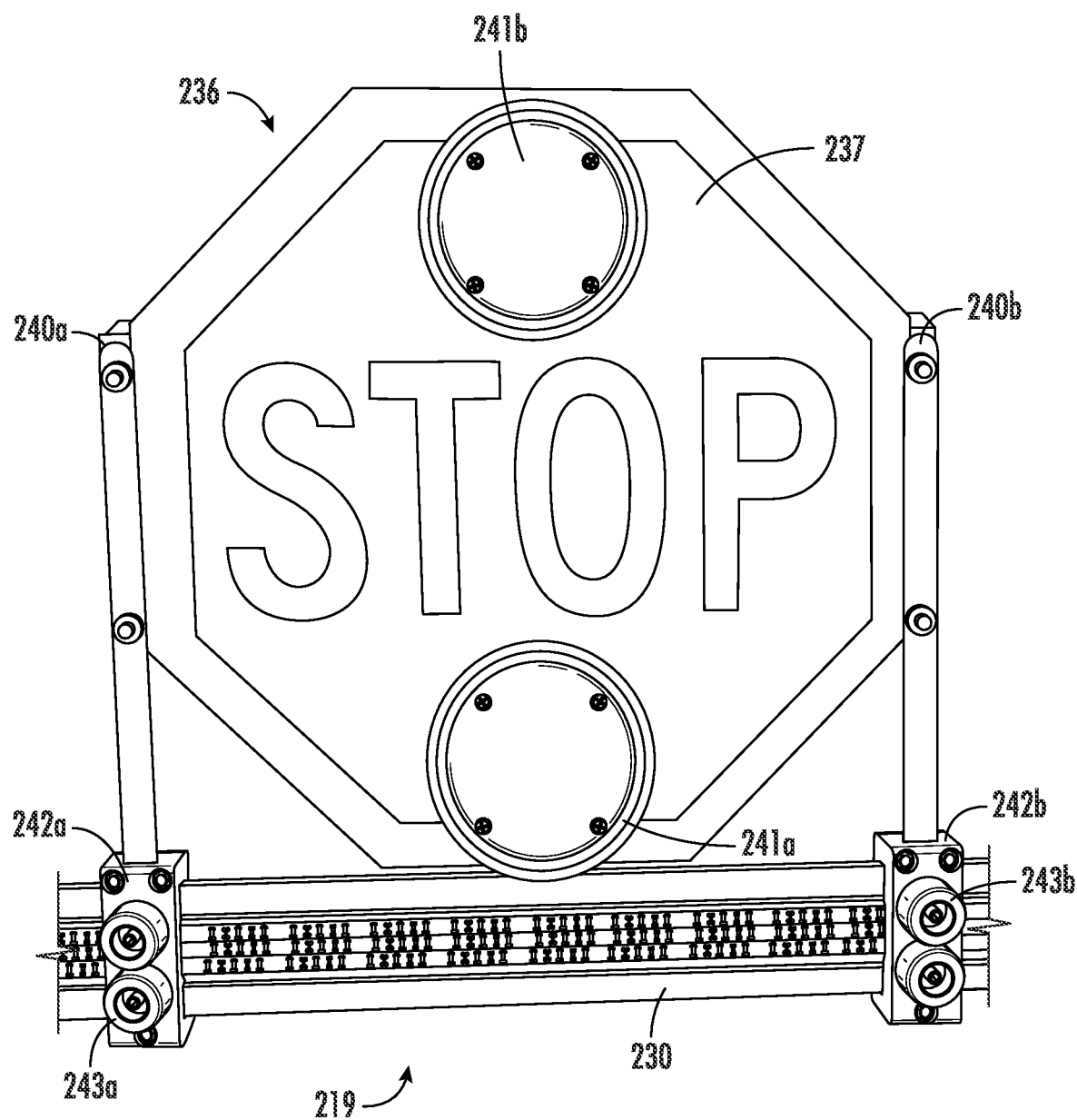
FIG. 11 is a schematic view of a sign assembly of the safety sign device of FIG. 9.
Figure 12:
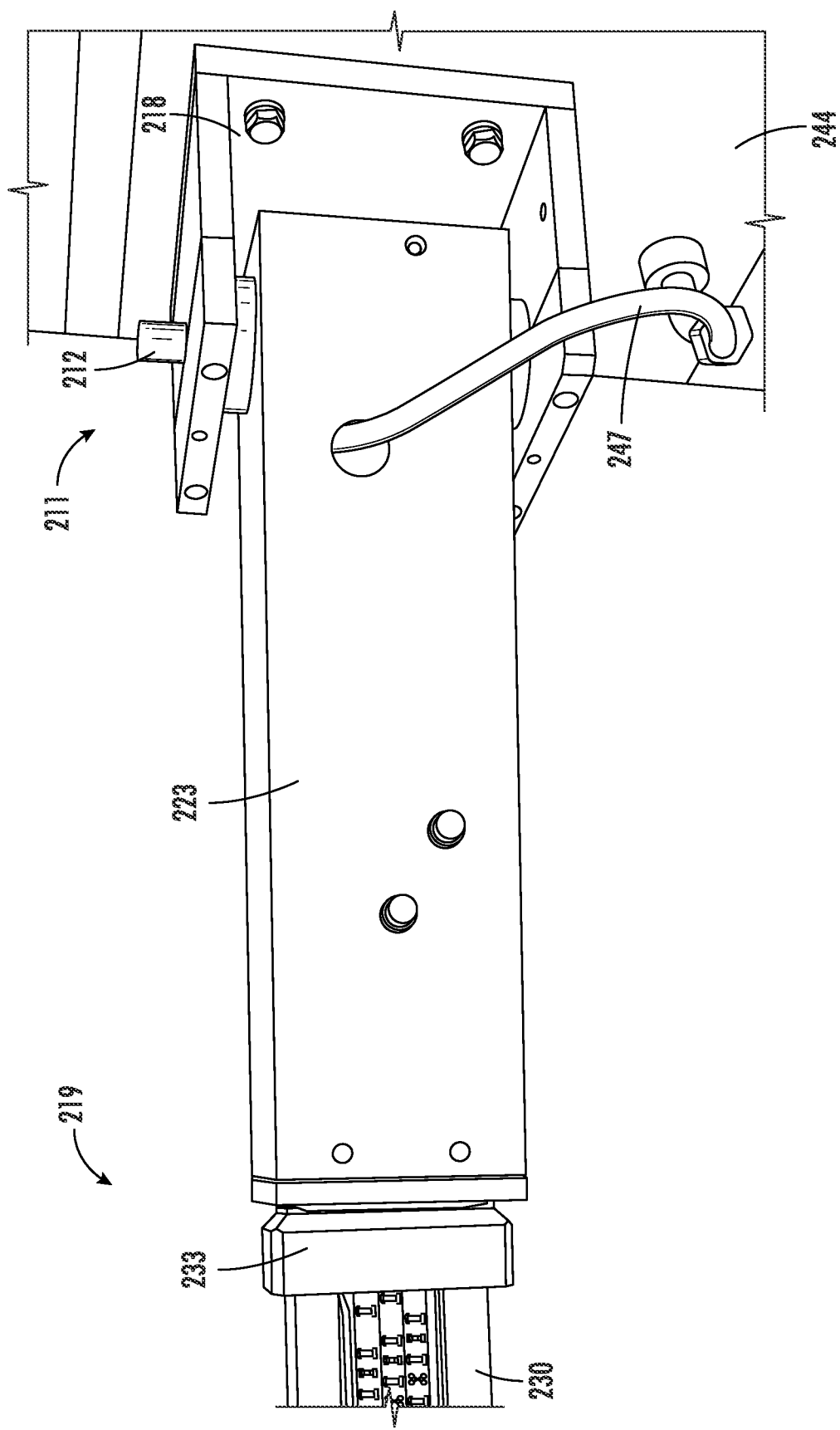
FIG. 12 is a schematic view of an elongate base of the safety sign device of FIG. 9.
Figure 13:
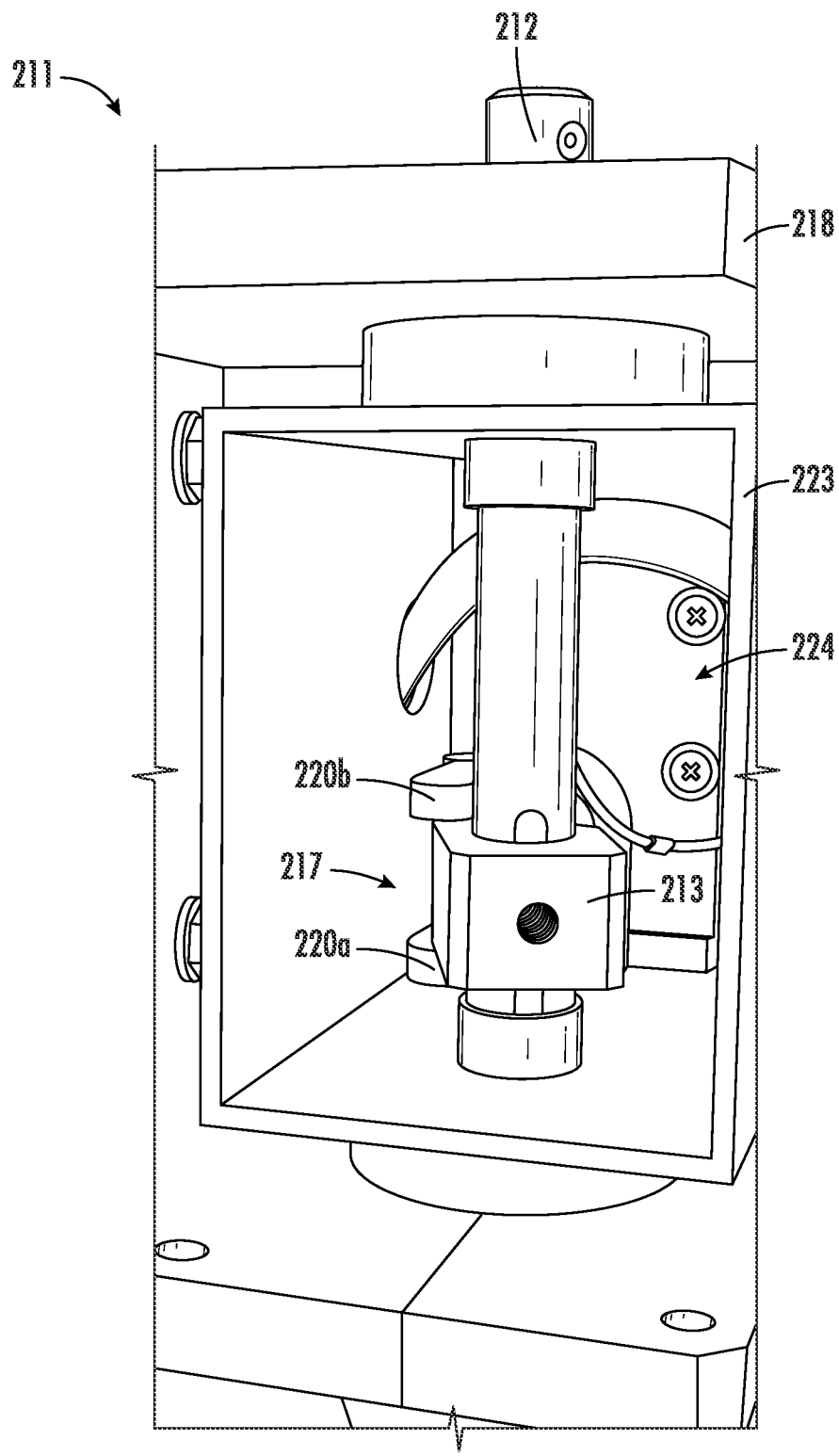
FIG. 13 is a schematic view of the elongate base, with portions of the housing removed, of the safety sign device of FIG. 9 in a retracted position.
Figure 14:
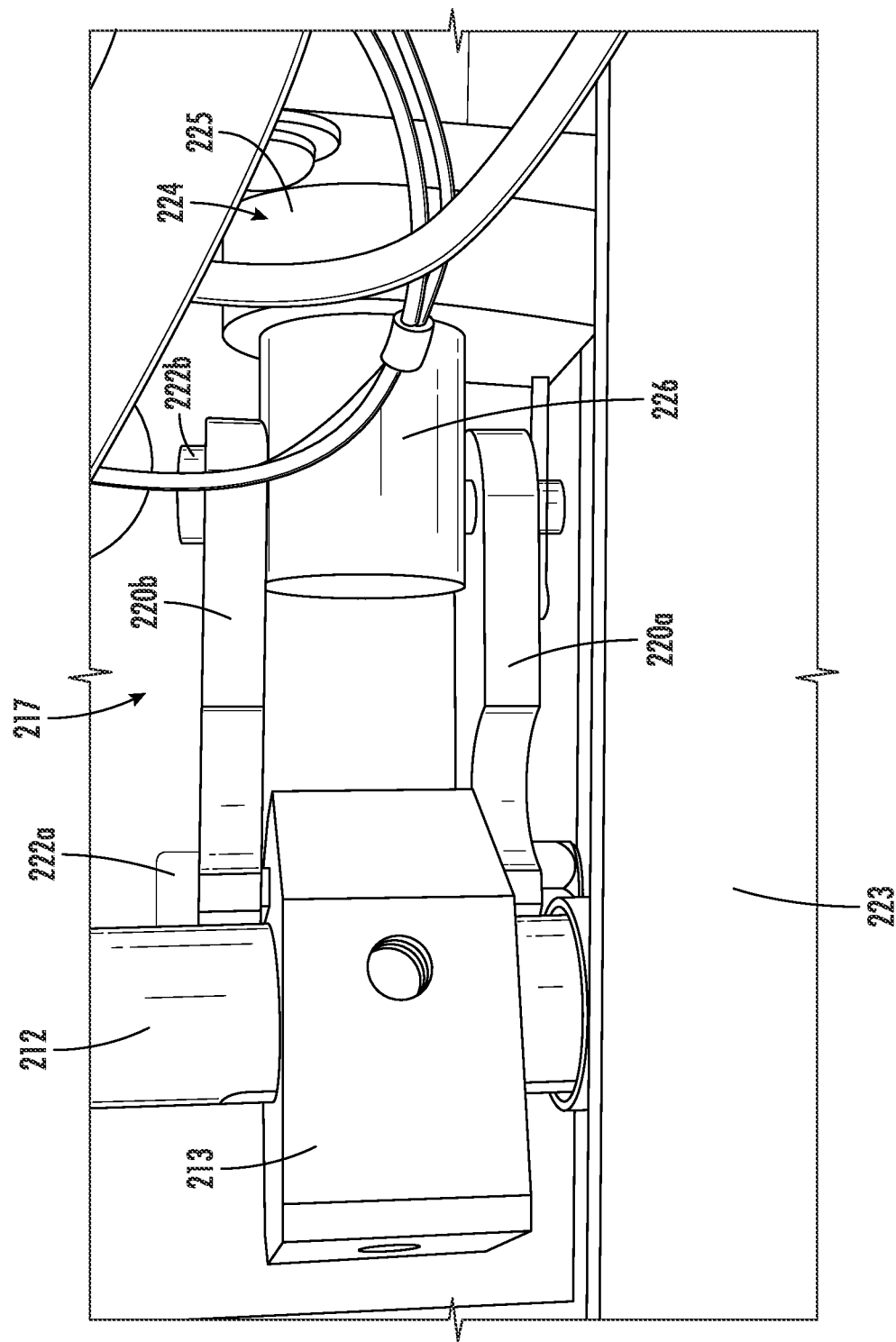
FIG. 14 is a schematic view of a link assembly and an electric motor of the safety sign device of FIG. 9.
Figure 15:
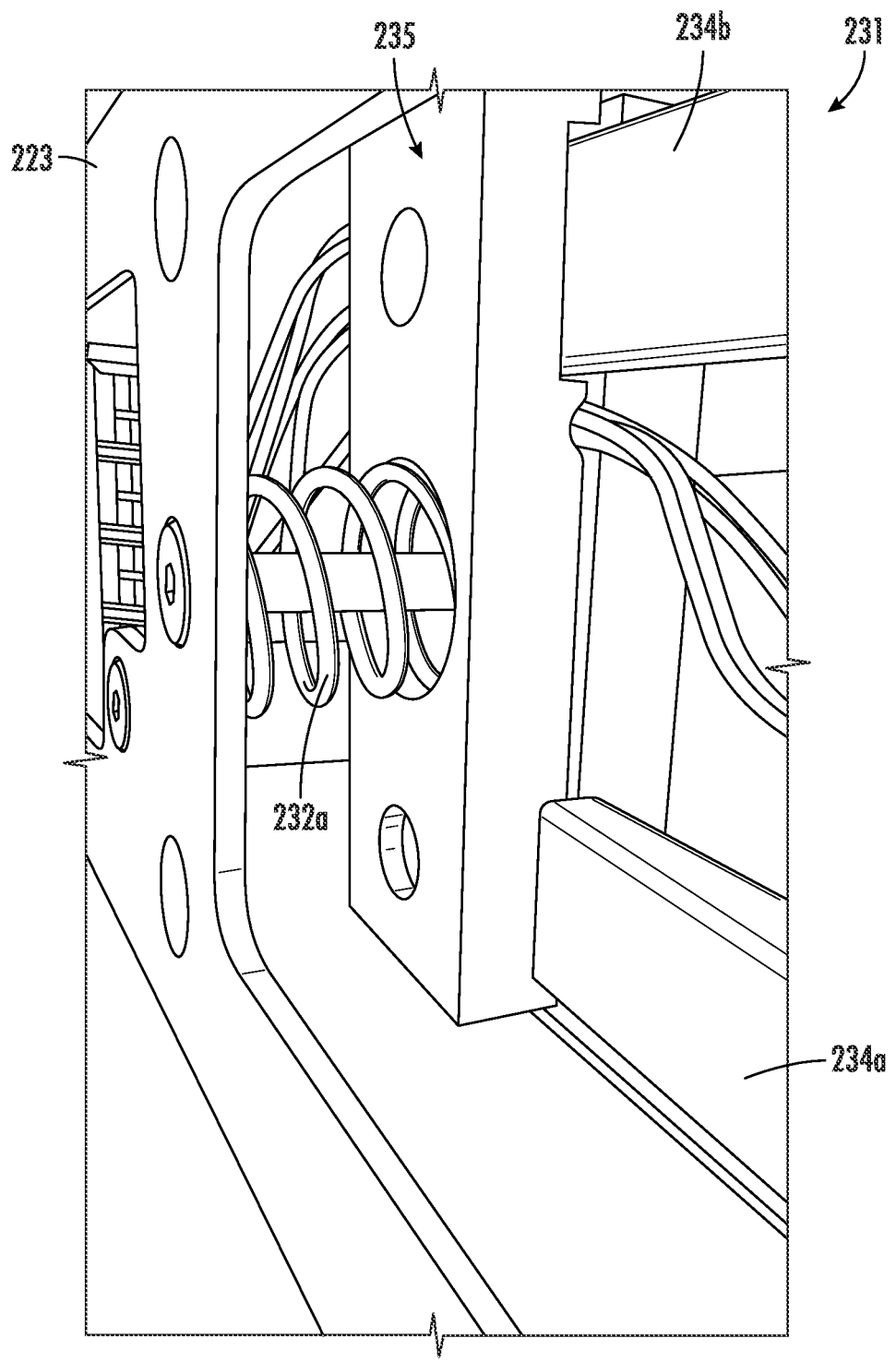
FIG. 15 is a schematic view of a connection assembly of the safety sign device of FIG. 9.
Figure 16:
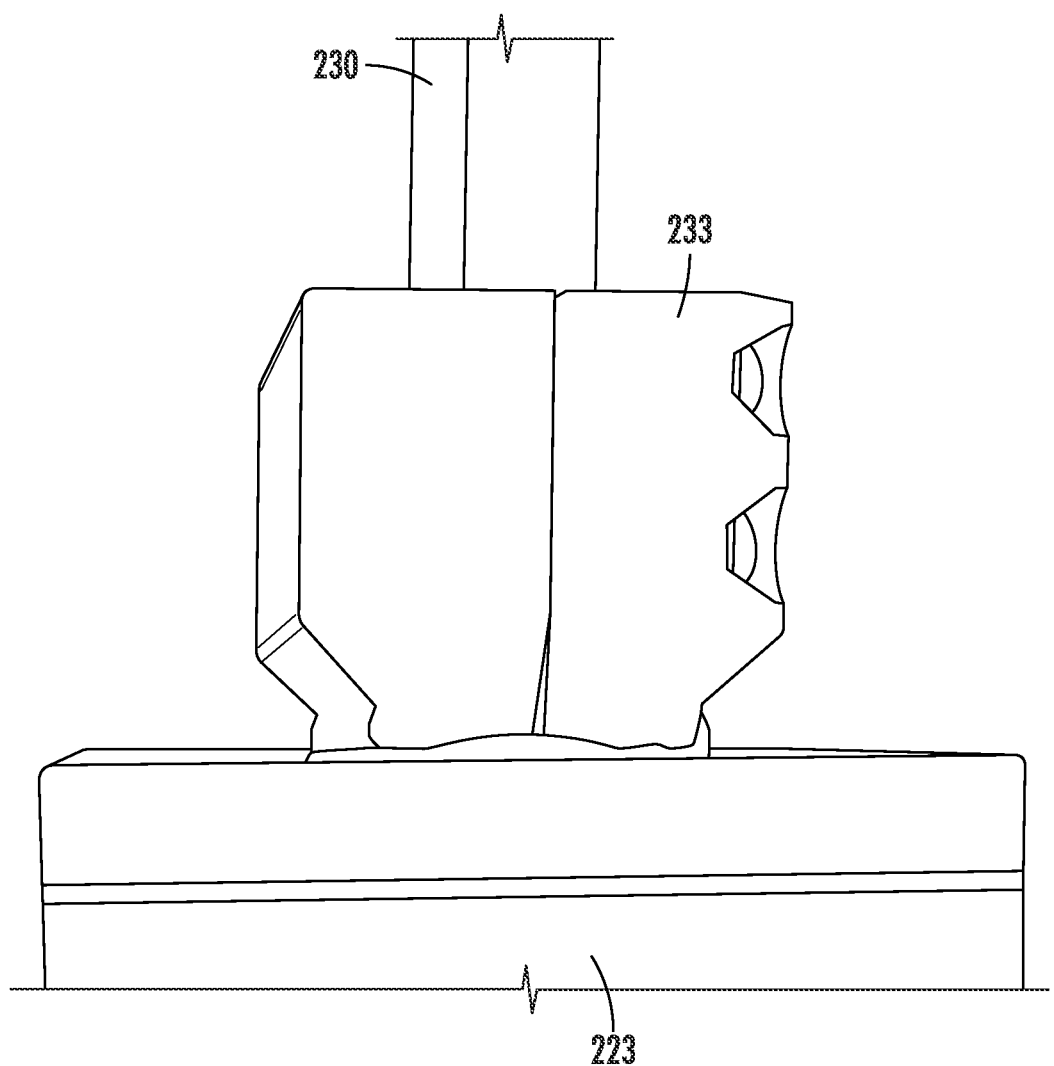
FIG. 16 is a schematic view of a retention plate of the safety sign device of FIG. 9.
Figure 17:
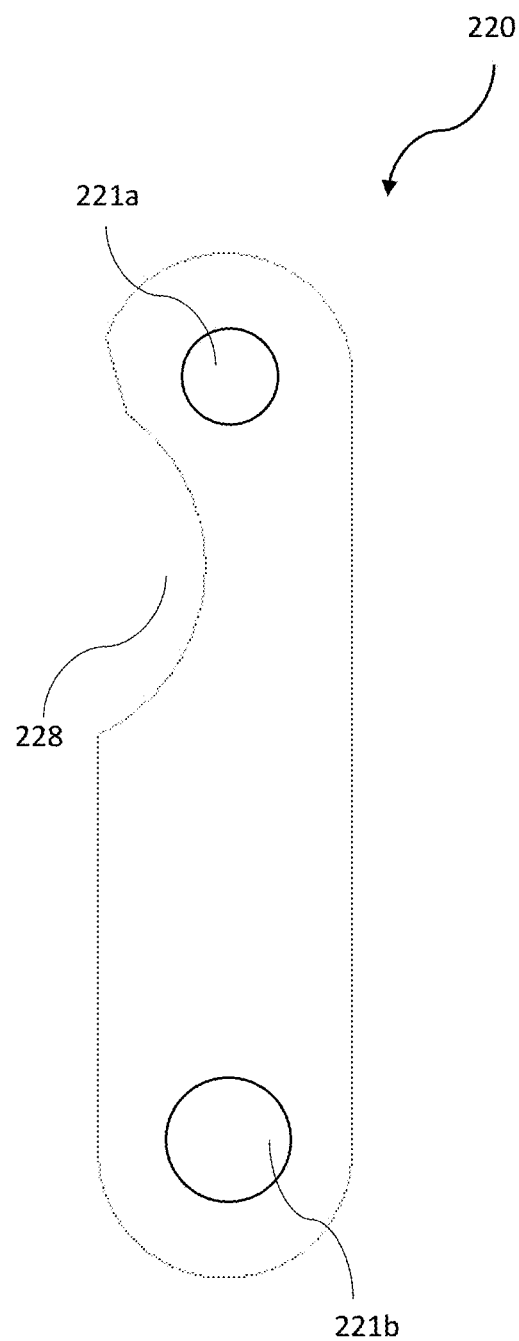
FIG. 17 is a schematic diagram of a link arm of the safety sign device of FIG. 9.
Figure 18:
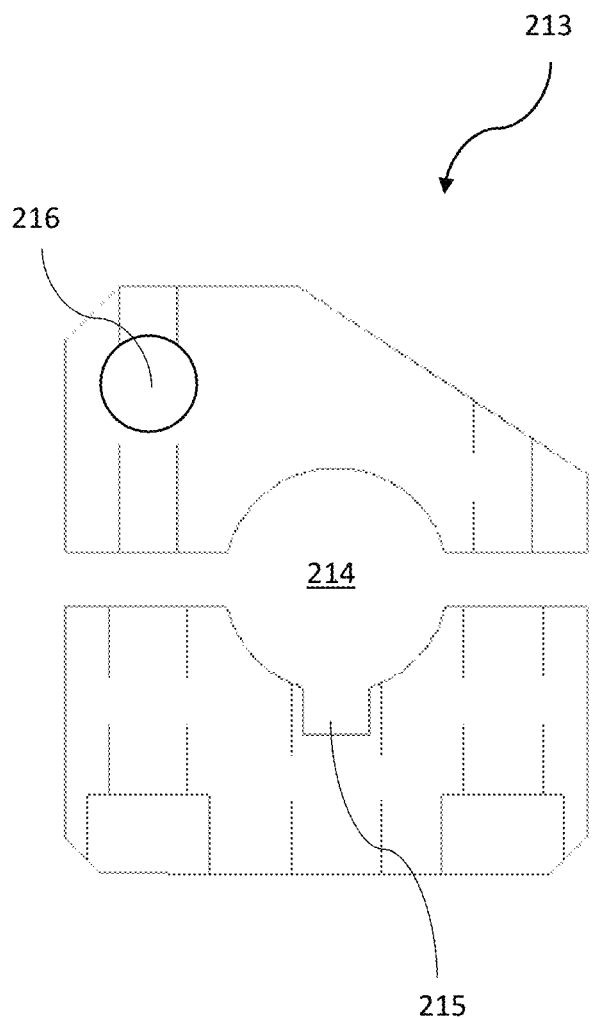
FIG. 18 is a schematic diagram of a toggle fitting of the safety sign device of FIG. 9.
Figure 19:
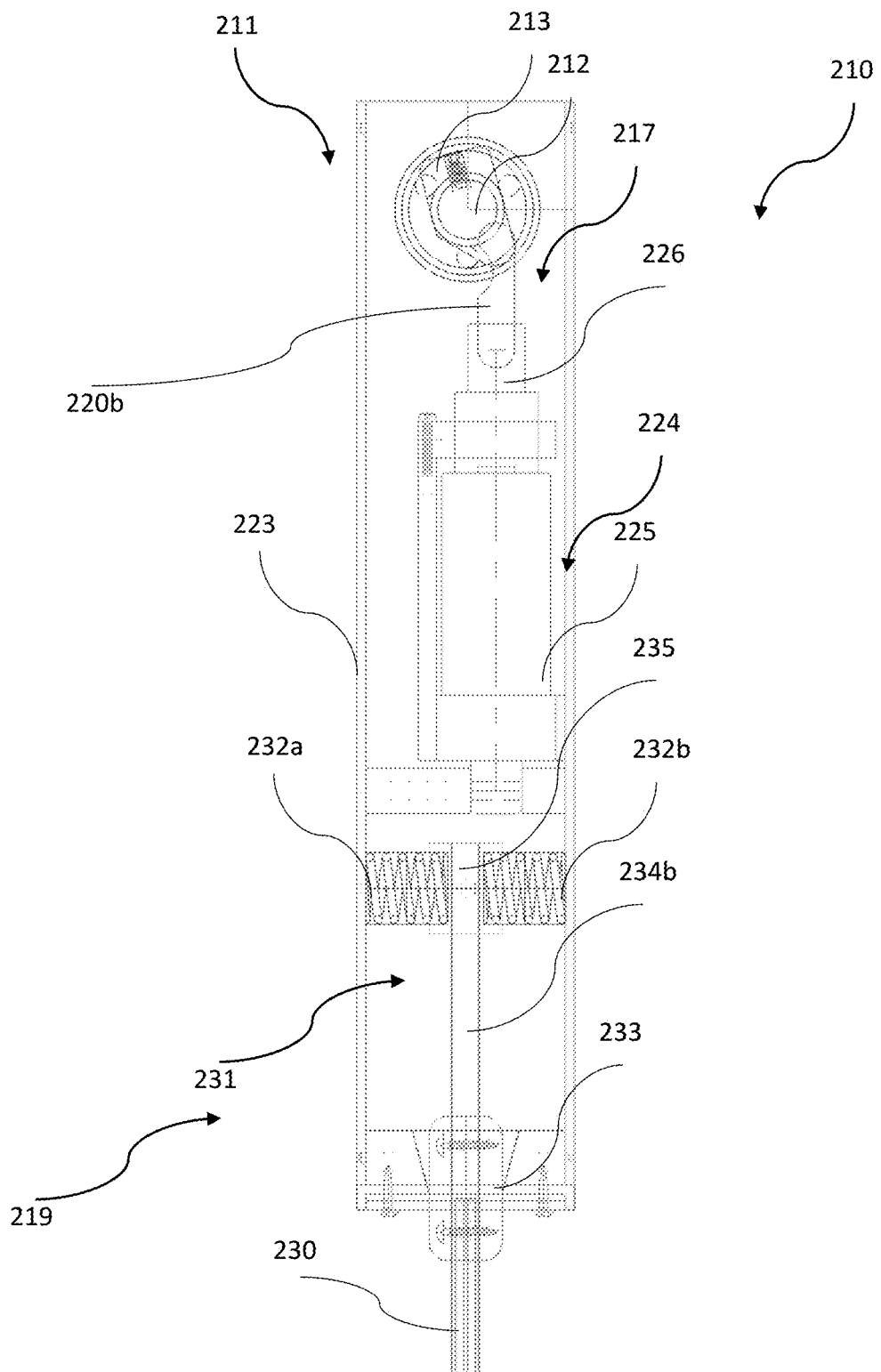
FIG. 19 is a schematic top plan view of the elongate base of the safety sign device of FIG. 9 with the housing removed.

As perhaps best seen in FIG. 11, the safety sign device 210 illustratively comprises a sign assembly 236 coupled to the arm 219 and being substantially parallel to the arm (i.e. within 20 degrees of parallel to each other). The sign assembly 236 illustratively comprises a sign 237, and first and second vertical arms 240a-240b coupled between the elongate housing 230 and the sign. The sign assembly includes a plurality of sign visual indicators 241a-241b coupled to the sign, and first and second slotted housings 242a-242b receiving the elongate housing 230 and the first and second vertical arms 240a-240b.

The sign assembly 236 illustratively comprises a plurality of flexible protrusions 243a-243b coupled respectively to the first and second slotted housings 242a-242b. The elongate housing 230 also includes additional flexible protrusions 243c-243d carried thereon. The plurality of flexible protrusions 243a-243d may comprise a rubber or plastic polymer material and may provide additional impact resistance.

The electric motor 224 is configured to extend and retract the arm 219 between a retracted position and an extended position. As perhaps best seen in FIGS. 13-14, the motor arm 226 is retracted within the motor housing 225, placing the arm 219 into the retracted position. The electric motor 224 is configured to extend the motor arm 226, and this causes rotational motion of the first and second link arms 220a-220b so that the longitudinal notch 228 is abutting the pin 212. Since the electric motor 224 is coupled to the elongate base 223, the rotational swing of the first and second link arms 220a-220b also rotates the arm 219 into the extended position.

Moreover, the plurality of visual indicators 227a-227n and the plurality of sign visual indicators 241a-241b are configured to be activated when the arm 219 is in the extended position. The elongate housing 230 comprises opposing first and second longitudinal sides, and the plurality of visual indicators 227a-227n are carried on both of the opposing first and second longitudinal sides.

Figure 10A:
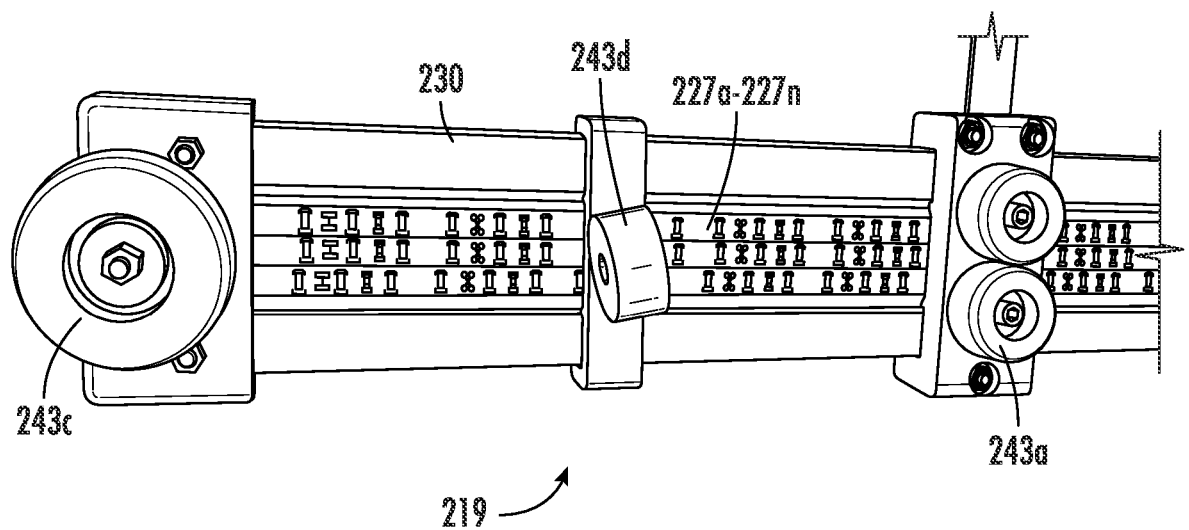
FIG. 10A is a schematic view of a portion of the elongate housing of the safety sign device of FIG. 9.
Figure 10B:
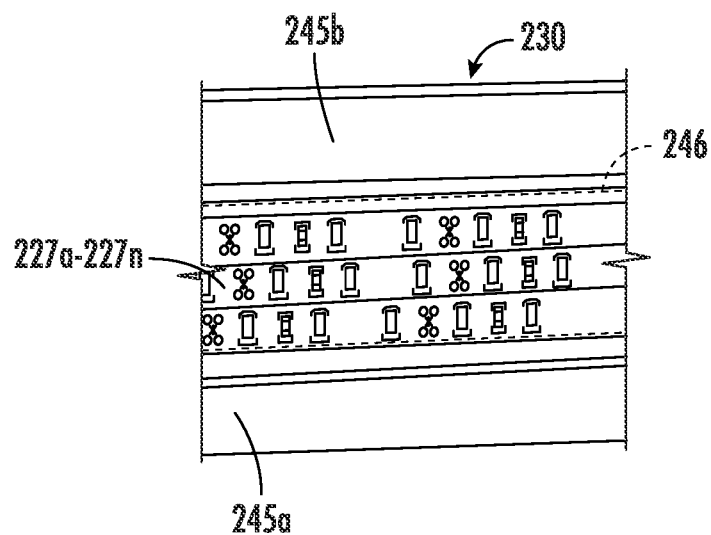
FIG. 10B is a schematic enlarged view of the elongate housing of the safety sign device of FIG. 9.

As perhaps best seen in FIG. 10B, the plurality of visual indicators 227a-227n are provided by three multicolored LED strips. Of course, the three strips are exemplary and other arrangements could be used. Moreover, the elongate housing 230 illustratively comprises first and second opaque rigid members 245a-245b flanking the three multicolored LED strips, and a transparent member 246 covering the three multicolored LED strips and being between the first and second opaque rigid members. In the illustrated embodiment, the safety sign device 210 comprises a plurality of sensors 249a-249b. The plurality of sensors 249a-249b may include an image sensor, and a sensor coupled to the image sensor and configured to detect when the arm 219 is flexed beyond a threshold limit while in the extended position.

Another aspect is directed to a method for making a safety sign device 210 for a vehicle 244. The method includes coupling a hinge 211 to a side of the vehicle 244, and coupling an arm 219 to the hinge. The arm 219 includes an elongate base 223, an electric motor 224 coupled to the elongate base, an elongate housing 230 coupled to the elongate base, and a plurality of visual indicators 227a-227n carried by the elongate housing. The method further includes coupling a sign 237 to the arm 219 and being substantially parallel to the arm. The hinge 211 comprises a pin 212, and a link assembly 217 coupled between the pin and the electric motor 224 and being rotatable about the pin. The electric motor 224 is configured to extend and retract the arm 219 between a retracted position and an extended position.

Figure 20:
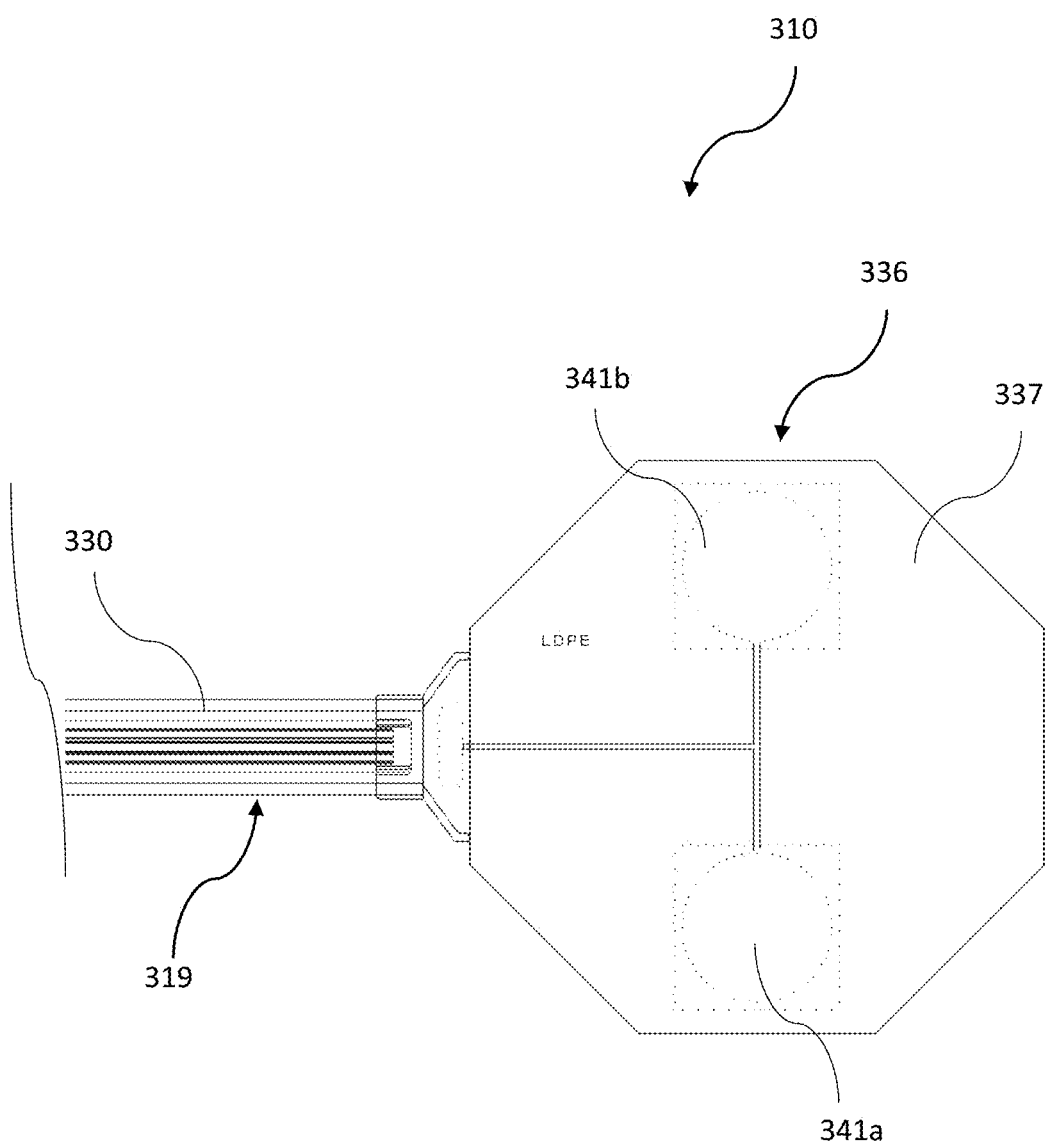
FIG. 20 is a schematic top front view of the elongate housing and sign assembly of another embodiment of the safety sign device of FIG. 9 with the housing removed, according to the present disclosure.

Referring now additionally to FIG. 20, another embodiment of the safety sign device 310 is now described. In this embodiment of the safety sign device 310, those elements already discussed above with respect to FIGS. 9-19 are incremented by 100 and most require no further discussion herein. This embodiment differs from the previous embodiment in that this safety sign device 310 illustratively includes a sign assembly 336 on a distal end of the elongate housing 330.

This sign assembly 336 may be used in addition or in alternative to the sign assembly 236 of the prior embodiment. Moreover, it should be appreciated that either of the safety sign devices 210, 310 may include one or more signs attached to the surface of the vehicle 244.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A safety sign device for a vehicle, the safety sign device comprising:
   a hinge being coupled a side of the vehicle;
   an arm comprising
      an elongate base,
      an electric motor coupled to the elongate base,
      an elongate housing coupled to the elongate base,
      a plurality of visual indicators carried by the elongate housing, and
      a connection assembly coupled between the elongate base and the elongate housing and comprising first and second elastic devices coupled to adjacent portions of the elongate base, the connection assembly being configured to permit the elongate housing to be flexible with respect to the elongate base; and
   a sign coupled to the arm and being substantially parallel to the arm;
   the electric motor configured to extend and retract the arm between a retracted position and an extended position.

2. The safety sign device of claim 1 wherein the connection assembly comprises first and second flexible strips coupled to the elongate housing, and a housing receiving the first and second flexible strips opposite the elongate housing.

3. The safety sign device of claim 2 wherein the housing receives the first and second elastic devices respectively on opposing surfaces of the housing; and wherein the housing is movable between the first and second elastic devices.

4. The safety sign device of claim 1 wherein the plurality of visual indicators is configured to be activated when the arm is in the extended position.

5. The safety sign device of claim 1 wherein the elongate housing comprises opposing first and second longitudinal sides; and wherein the plurality of visual indicators are carried on both of the opposing first and second longitudinal sides.

6. The safety sign device of claim 1 further comprising an image sensor, and a sensor coupled to the image sensor and configured to detect when the arm is flexed beyond a threshold limit while in the extended position.

7. The safety sign device of claim 6 wherein when the sensor is triggered, the image sensor is configured to record an area adjacent the arm.

8. A method for making a safety sign device for a vehicle, the method comprising:
   coupling a hinge to a side of the vehicle;
   coupling an arm to the hinge, the arm comprising
      an elongate base,
      an electric motor coupled to the elongate base,
      an elongate housing coupled to the elongate base,
      a plurality of visual indicators carried by the elongate housing, and
      a connection assembly coupled between the elongate base and the elongate housing and comprising first and second elastic devices coupled to adjacent portions of the elongate base, the connection assembly being configured to permit the elongate housing to be flexible with respect to the elongate base; and
   coupling a sign to the arm and being substantially parallel to the arm;
   the electric motor configured to extend and retract the arm between a retracted position and an extended position.

9. The method of claim 8 wherein the connection assembly comprises first and second flexible strips coupled to the elongate housing, and a housing receiving the first and second flexible strips opposite the elongate housing.

10. The method of claim 9 wherein the housing receives the first and second elastic devices respectively on opposing surfaces of the housing; and wherein the housing is movable between the first and second elastic devices.

11. The method of claim 8 wherein the plurality of visual indicators is configured to be activated when the arm is in the extended position.

12. The method of claim 8 wherein the elongate housing comprises opposing first and second longitudinal sides; and wherein the plurality of visual indicators are carried on both of the opposing first and second longitudinal sides.

13. The method of claim 8 further comprising coupling an image sensor, and a sensor to the image sensor and configured to detect when the arm is flexed beyond a threshold limit while in the extended position.

14. The method of claim 13 wherein when the sensor is triggered, the image sensor is configured to record an area adjacent the arm.

15. A safety sign device for a vehicle, the safety sign device comprising:
- a hinge being coupled a side of the vehicle;
- an arm comprising
  - an elongate base,
  - an electric motor coupled to the elongate base,
  - an elongate housing coupled to the elongate base,
  - a plurality of visual indicators carried by the elongate housing, and
  - a connection assembly coupled between elongate base and the elongate housing; and
- a sign coupled to the arm and being substantially parallel to the arm;
- the electric motor configured to extend and retract the arm between a retracted position and an extended position;
- an image sensor; and
- a sensor coupled to the image sensor and configured to detect when the arm is flexed beyond a threshold limit while in the extended position.

16. The safety sign device of claim 15 wherein the plurality of visual indicators is configured to be activated when the arm is in the extended position.

17. The safety sign device of claim 15 wherein the elongate housing comprises opposing first and second longitudinal sides; and wherein the plurality of visual indicators are carried on both of the opposing first and second longitudinal sides.

18. The safety sign device of claim 15 wherein when the sensor is triggered, the image sensor is configured to record an area adjacent the arm.

* * * * *